United States Patent
Mickelson

(10) Patent No.: US 6,866,026 B2
(45) Date of Patent: Mar. 15, 2005

(54) GASKET FOR FUEL INJECTOR

(75) Inventor: Michael Mickelson, Gurnee, IL (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 37 days.

(21) Appl. No.: 10/649,024

(22) Filed: Aug. 27, 2003

(65) Prior Publication Data

US 2004/0040543 A1 Mar. 4, 2004

Related U.S. Application Data

(60) Provisional application No. 60/406,503, filed on Aug. 28, 2002.

(51) Int. Cl.$^7$ ............................ F02M 61/14; F02F 11/00
(52) U.S. Cl. ........................ 123/470; 277/313; 277/593
(58) Field of Search ............................... 123/468–470, 123/509; 277/313, 591–596

(56) References Cited

U.S. PATENT DOCUMENTS

| | | | | |
|---|---|---|---|---|
| 3,038,456 A | | 6/1962 | Dreisin | 123/32 |
| 3,695,235 A | | 10/1972 | Anderson | 123/32 |
| 3,729,205 A | * | 4/1973 | Kwok | 277/592 |
| 3,841,277 A | * | 10/1974 | Schafer | 123/470 |
| 4,296,887 A | | 10/1981 | Hofmann | 239/397.5 |
| 4,428,593 A | * | 1/1984 | Pearlstein | 277/596 |
| 4,528,959 A | | 7/1985 | Hauser, Jr. | 123/470 |
| 4,535,999 A | * | 8/1985 | Locacius | 277/596 |
| 5,129,658 A | * | 7/1992 | Berton et al. | 277/591 |
| 5,345,913 A | | 9/1994 | Belshaw et al. | 123/470 |
| 5,785,024 A | | 7/1998 | Takei et al. | 123/470 |
| 6,186,123 B1 | | 2/2001 | Maier et al. | 123/470 |
| 6,334,433 B1 | | 1/2002 | Sumida et al. | 123/470 |
| 6,343,795 B1 | * | 2/2002 | Zerfass et al. | 277/593 |
| 6,481,421 B1 | * | 11/2002 | Reiter | 123/470 |
| 6,585,272 B2 | * | 7/2003 | Inamura et al. | 277/592 |
| 2003/0183201 A1 | * | 10/2003 | Hans | 123/470 |

* cited by examiner

*Primary Examiner*—Weilun Lo
(74) *Attorney, Agent, or Firm*—Howard & Howard

(57) ABSTRACT

A gasket (48, 48', 48") and (70) for disposition between a fuel injector (22) and a cylinder head (14) comprises compressible polymer layers (62, 64, 74, 92) and incompressible and flat metal layers (60, 72, 90) sandwiched between the polymer layers. In the embodiments of FIGS. 6–8, a polymer body (80, 96) is disposed radially inwardly of the incompressible layer (72) or layers (90) and includes a bead portion (86) thicker than the total thickness of the incompressible and polymer layers (72), and (74, 90) and (92). The body (80, 96) also includes a recess portion (82–84) having a thickness less than the total thickness to define a recess (88) adjacent the bead portion (86). The bead portion (86) is disposed radially between the recess portion (82–84) and the incompressible layer (72 or 90).

19 Claims, 3 Drawing Sheets

US 6,866,026 B2

GASKET FOR FUEL INJECTOR

CROSS-REFERENCES TO RELATED APPLICATIONS

The subject application claims the priority of provisional application Ser. No. 60/406,503 filed Aug. 28, 2002.

BACKGROUND OF THE INVENTION

1. Field of the Invention

The subject invention relates to a gasket particularly suitable for disposition between a cylinder head and a fuel injector in an internal combustion engine.

2. Description of the Related Art

The prior art is replete with gaskets for disposition between a fuel injector and the bore of a cylinder head in an internal combustion engine. The combustion chamber of the cylinder into which the fuel injector supplies fuel creates high temperatures and high pressures that are subjected to the interface between the injector and the bore of the cylinder head in which it is disposed. Various configurations of gaskets are used to seal this gap and examples are disclosed in U.S. Pat. No. 3,038,456 to Dresin, U.S. Pat. No. 5,785,024 to Takei et al and U.S. Pat. No. 6,334,433 to Sumida et al.

In order to obtain the desired sealing characteristics, it has been the practice to apply a relatively high clamping force on the injector to urge the injector against the gasket. However, this high clamping load facilitates the transmission of vibration and noise from the injector. Accordingly, it is an ongoing objective to maximize the resistance to high temperature with a reduction in the transmission of noise and vibration under relatively low clamping loads while providing adequate sealing.

BRIEF SUMMARY OF THE INVENTION AND ADVANTAGES

The subject invention provides such an improved gasket for an internal combustion engine having a cylinder head defining a bore extending to a radially extending shoulder surrounding an opening for receiving a fuel injector disposed in the bore in engagement with the shoulder and having a tip extending through the opening. A gasket is disposed between the fuel injector and the seating surface and includes at least one incompressible and flat layer sandwiched between two compressible polymer layers with the polymer layers extending radially completely over the incompressible layer.

The gasket provides an effective seal against leakage of combustion gases and isolates the injector from direct contact with the cylinder head to limit the transmission of noise, vibration, and the like, between the cylinder head and injector. The gasket allows lower clamping forces on the injector to diminish the transmission of such noise, vibration, and the like.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
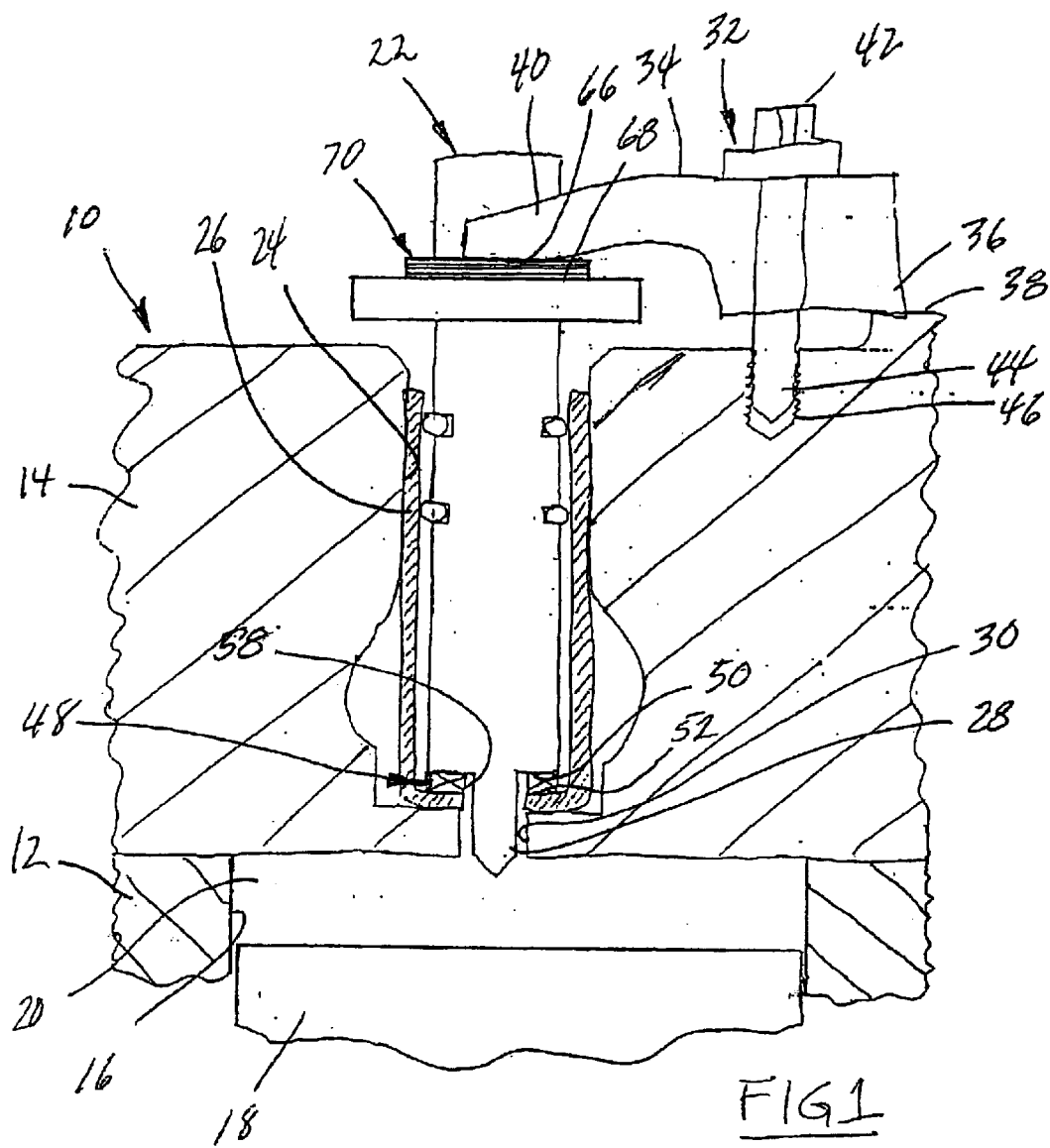
FIG. 1 is a fragmentary cross sectional view of an internal combustion engine with a fuel injector and incorporating the gasket of the subject invention.

Referring to the Figures, wherein like numerals indicate like or corresponding parts throughout the several views, an internal combustion engine is generally shown at 10, and particularly a diesel engine, having an engine block 12, a cylinder head 14, and a piston cylinder 16 accommodating a reciprocating piston 18 and defining a combustion chamber 20 between the piston 18 and head 14 confined by the walls of the cylinder 16 in known manner.

A fuel injector 22 is disposed in an injector bore 24 of the head 14 and a sleeve 26 lines the bore 24. An injector tip or nozzle 28 extends through an opening 30 in the head 14 and the sleeve 26 leading to the combustion chamber 20 for delivery of fuel by the injector 20 in known manner. The injector 22 is fixed in place by an injector clamp 32. The clamp 32 comprises a clamp arm 34 resting at an outer end 36 on a support surface 38 of the head 14 and extends in cantilevered fashion therefrom to a forked end 40 in position over the injector 22, such that the clamp arm 34 bridges an open space between the support surface 38 and the injector 22. A clamping bolt 42 extends through the arm 34 at a location spaced between the support surface 38 and injector 32 and has a threaded end 44 screwed into a threaded hole 46 of the cylinder head 14. The forked end 40 of the clamp arm 34 is drawn downwardly toward engagement with the injector 22 by tightening the bolt 42, forcing the injector 22 downwardly in the injector bore 24. Thus, a clamping load is placed upon the injector forcing the injector into the bore and compressing the gasket.

According to the invention, a gasket, generally indicated at 48, is disposed between a lower, radially extending shoulder 50 of the injector 22 and an opposing shoulder 50 of the head 14 or underlying lip 52 of the sleeve 26 (or head 14) surrounding the opening 30. The gasket 48 serves to seal the opening 30 against the leakage of combustion gasses past the shoulder 50 of the injector 22, and further serves to isolate the lower end of the injector 22 from direct metal-to-metal contact with the cylinder head 14 either directly or through the metal sleeve 26 in order to limit transmission of noise, vibration and/or harshness from the fuel injector 22 into the head 14 or block 12.

Figure 2:
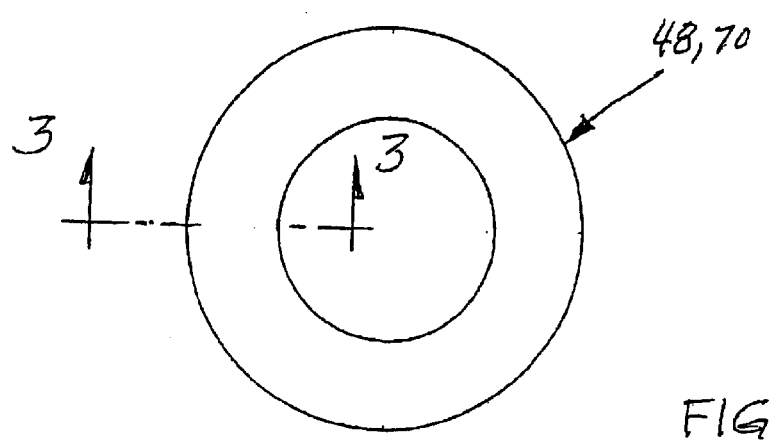
FIG. 2 is a plan view of the gasket of the subject invention.
Figure 3:
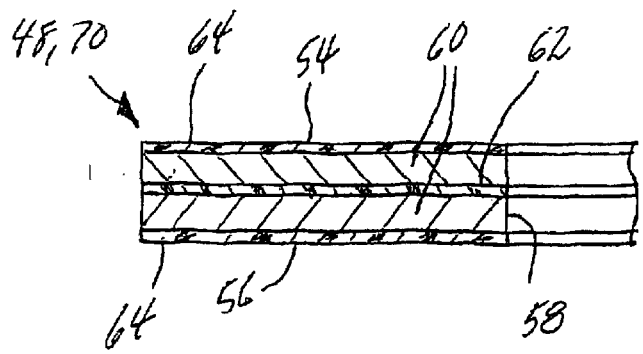
FIG. 3 is a fragmentary cross sectional view of a first embodiment of the gasket of the subject invention.
Figure 4:
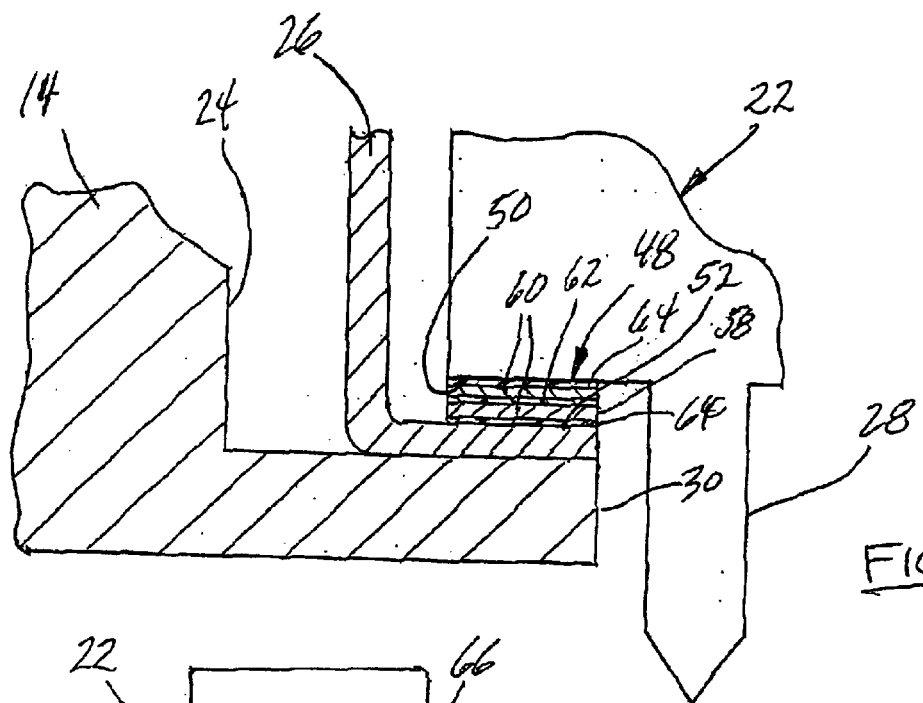
FIG. 4 is a fragmentary cross sectional view of the gasket of FIG. 3 shown between a cylinder head and an injector.

A first preferred embodiment of the gasket 48 is illustrated in FIGS. 2–4 and includes of the both sealing and isolating properties mentioned above. The gasket 48 comprises a generally ring or washer-shaped member having a composite, multi-layer metal/polymeric composition. The gasket 48 has an upper sealing surface 54 which sealingly engages the shoulders 50 of the injector 22, and a lower sealing surface 56 which sealingly engages the lip 52 of the sleeve 26. The gasket 48 has a central hole 58 aligned with the opening 30 and through which the injector tip 28 extends into the combustion chamber 20.

Referring more particularly to FIGS. 3 and 4, the gasket 48 has at least two metal layers 60 separated by an intermediate polymer layer 62. The outer surfaces of the metal layers 60 are further covered by outer polymer layers 64 which are in direct contact with the shoulders 50, 52 in use, as illustrated in FIG. 4.

The metal layers 60 are preferably flat (or planar) and incompressible in the direction of axial loading by the clamping force applied to the injector 22. In other words, the flat metal layers 60 do not deflect or bend when compressed under load, but provide a ridged inflexible foundation for supporting the multiple polymer layers 62, 64.

The polymer layers 62, 64 are elastically compressible under load between the shoulders 50, 52 and serve both sealing and isolating functions of the gasket 48. In use, the gasket 48 will see compression loads of at least 1000 psi (for gasoline engine applications) and up to 3000 psi (for diesel engine applications). The material selected for the polymer layer 62, 64 is one which must withstand the heat and pressure of combustion as well as the corrosive environment due to its direct exposure to the combustion chamber 20. Candidate materials include, but are not limited to, Nitrile and fluoroelastomers, In order for the polymer layers 62, 64 to perform both sealing and isolating functions, it has been found that the polymer layers 62, 64 must have a minimum thickness of about 0.005 inches. Below this lower limit, the polymer layers 62, 64 are unable to provide acceptable isolating characteristics and would allow for the transmission of unacceptable levels of noise, vibration and/or harshness through the polymer layer 62, thus failing to properly isolate the lower end of the injector 22 from the sleeve 26 and head 14. It has further been found that the polymeric layer 64 cannot be made too thick or else the layers are prone to rupturing and/or extruding radially under the heavy compression loads applied in service. It has been found that an upper limit of 0.025 inches of each of the polymer layers 62, 64 enables them to achieve both sealing and isolating functions without rupturing under compression loads as high as 3000 psi.

Depending upon the particular application, additional metal layers 60 and well as corresponding additional polymer layers 62, 64 can be added.

Figure 5:
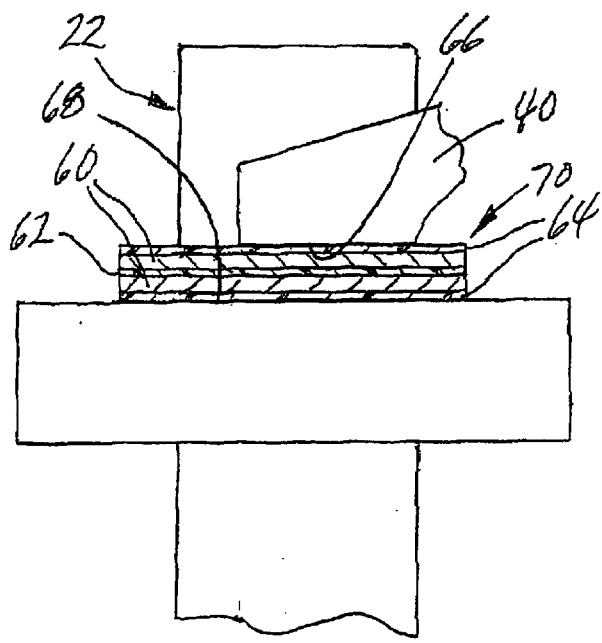
FIG. 5 is a fragmentary cross sectional view showing the gasket of FIG. 3 disposed at the upper end of the injector.

As best illustrated in FIGS. 1 and 5, an upper gasket 70 of preferably the same type of gasket as that of gasket 48 can be disposed between an upper shoulder 66 of the injector 22 and a lower shoulder 68 of the forked end 40 of the clamp arm 34 in order to isolate transmission of noise, vibration and/or harshness from the injector 22 to the metal clamp arm 34 and, ultimately, to the head 14 through the bolt 42 and outer end 36 of the injector clamp 32. As shown in FIG. 5, the upper isolator gasket 70 preferably has the same multi-layer construction as that used for the lower gasket 48, and preferably as identically constructed.

Figure 6:
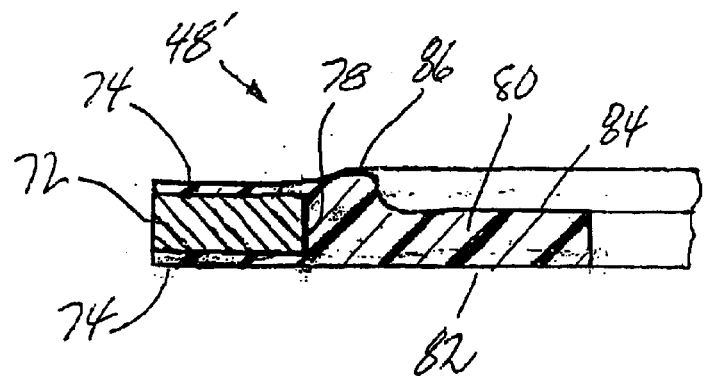
FIG. 6 is a fragmentary cross sectional view of another embodiment of the gasket of the subject invention.
Figure 7:
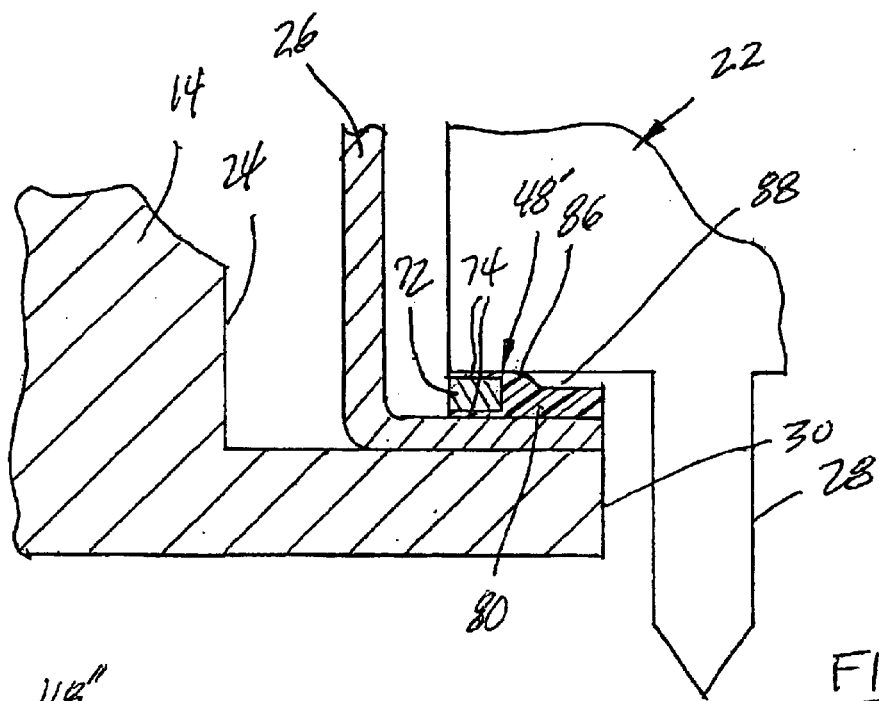
FIG. 7 is a fragmentary cross sectional view of the gasket of FIG. 6 disposed between a cylinder head and an injector.

FIGS. 6 and 7 illustrate an alternative construction of the lower gasket 48'. The gasket 48' has a flat, incompressible metal core 72 having a washer or ring configuration coated on its upper and lower surfaces with outer polymer layers 74. The core 72 has an inner circumferentially continuous edge surface 78, radially inwardly from which extends a body 80 of the polymer material, formed preferably as a one-piece molded extension of the outer polymer layers 74. The body 80 has a lower surface 82 flush with the lower surface of the lowermost polymer layer 74, and an upper surface 84 spaced axially inwardly of the upper surface of the uppermost of the polymer layer 74. The body 80 has an annular bead 86 adjacent the inner edge 78 which projects above the upper surface of the uppermost polymer layer 74. As illustrated, the body 80 is free of any metal material inwardly of the edge 78 of the core 72. The thickness of the bead 86 is preferably in the range of 0.03 to 0.04 inches, while the thickness of the core 72 is between 0.024 to 0.027 inches. Under compression, the body 80 is elastically compressed between the shoulders 50, 52, but limited in amount by the incompressibility of the core 72, so as to achieve sealing without rupturing the thick body 86. The outer polymer layer 74 overlying the upper and lower surfaces of the metal core 72 have maximum thicknesses of 0.008 inches, and thus do not rupture under load, but still serve to isolate the injector 20 from the head 14.

As best shown in FIG. 7, the metal core 72 is spaced radially outwardly from the opening 30, effectively forming an annular groove 88 between the shoulder 50, 52 and the inner edge 78 in which the body 80 of the polymer layer is captured. When exposed to the high temperature and pressure of the combustion chamber (pressures in the range of 2000 to 4500 psi and temperatures of between 350° to 450° F.) the body 80 has a tendency to flow radially outwardly, but is constrained by the inner edge 78 of the metal core and the shoulders 50, 52 of the injector 22 and sleeve 26 so as to maintain a high integrity seal under such conditions.

Figure 8:
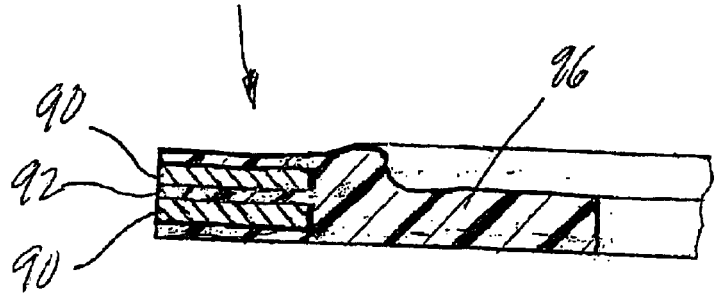
FIG. 8 is a fragmentary cross sectional view of yet another embodiment of the gasket of the subject invention.

FIG. 8 illustrates a third embodiment of the lower gasket 48" which effectively adds the previously described elastomer or ploymeric body 80 to the multi-layer core of the gasket 48 of the first embodiment. In the FIG. 8 embodiment, the core 72 is made up of at least two metal layers 90 separated by an intermediate polymer layer 92 and coated 92 and coated on its outer surface with outer polymer layers 94. A body 96 of the polymer material extends radially inwardly and preferably is of the same construction of the body 80 of the second embodiment, and further preferably molded as one piece with the layers 92 and 94. The gasket 48" of FIG. 8 functions in the same manner as that of the gasket 48' of the second embodiment. The polymer materials for the second and third embodiments 48', 48" are preferably the same as those used for the first embodiment 48.

Accordingly, the invention provides a gasket 48, 48', 48" and 70 comprising at least two compressible polymer layers 62, 64, 74, 92 and at least one incompressible and flat layer 60, 72, 90 sandwiched between the polymer layers with the incompressible layer preferably consisting of non-bendable metal. The polymer layers extend radially completely over the incompressible layer so that the incompressible layer is completely covered, except for the peripheral edges. The incompressible layer defines a washer-like shape with a central hole 58. In the embodiments of FIGS. 6–8, a polymer body 80, 96 is disposed in the hole radially inwardly of the incompressible layer 72 or layers 90, the polymer layers and the polymer body being integral and of the same polymer. The body 80, 96 includes a bead portion 86 thicker than the total thickness of the incompressible and polymer layers 72, and 74, 90 and 92. The body 80, 96 includes a recess portion 82–84 having a thickness less than the total thickness to define a recess 88 adjacent the bead portion 86. The bead portion 86 is disposed radially between the recess portion 82–84 and the incompressible layer 72 or 90. The embodiment of FIG. 6 includes a single incompressible layer 72 whereas the embodiments of FIGS. 3–5 and FIG. 8, respectively, include a plurality of the incompressible layers

60 and 90 with a sandwiched layer 62 or 92 of polymer disposed between the adjacent incompressible layers.

It is to be understood that other embodiments of the invention which accomplish the same function are incorporated herein within the scope of any ultimately allowed patent claims.

Obviously, many modifications and variations of the present invention are possible in light of the above teachings. The invention may be practiced otherwise than as specifically described within the scope of the appended claims.

What is claimed is:

1. An internal combustion engine comprising;
   a cylinder head having a bore extending to a radially extending shoulder surrounding an opening,
   a fuel injector disposed in said bore in engagement with said shoulder and having a tip extending through said opening,
   a gasket disposed between said fuel injector and a seating surface,
   said gasket including at least one incompressible and flat layer that is incompressible in the axial direction of said bore and sandwiched between two compressible polymer layers with said polymer layers extending radially completely over said incompressible layer.

2. An assembly as set forth in claim 1 wherein said incompressible layer consists of metal and is non-bendable.

3. An assembly as set forth in claim 1 wherein said incompressible layer defines a washer-like shape with a central hole, and including a polymer body disposed in said hole radially inwardly of said incompressible layer.

4. An assembly as set forth in claim 3 wherein said polymer layers and said polymer body are integral and of the same polymer.

5. An assembly as set forth in claim 3 wherein said body includes a bead portion thicker than the total thickness of said incompressible and polymer layers.

6. An assembly as set forth in claim 5 wherein said body includes a recess portion having a thickness less than said total thickness to define a recess adjacent said bead portion.

7. An assembly as set forth in claim 6 wherein said bead portion is disposed radially between said recess portion and said incompressible layer.

8. An assembly as set forth in claim 7 including a plurality of said incompressible layers with a sandwiched layer of polymer disposed between adjacent incompressible layers.

9. An assembly as set forth in claim 1 including a plurality of said incompressible layers with a sandwiched layer of polymer disposed between adjacent incompressible layers.

10. An assembly as set forth in claim 1 wherein said cylinder head includes a sleeve disposed in said bore and surrounding said injector and including a radially inwardly extending lip disposed between said gasket and said shoulder.

11. An assembly as set forth in claim 1 wherein said polymer layers have a thickness of at least 0.005 inches and no greater than 0.025 inches.

12. A gasket comprising at least two compressible polymer layers and at least one incompressible and flat layer sandwiched between said polymer layers,
    said incompressible layer defines a washer-like shape with a central hole, and including a polymer body disposed in said hole radially inwardly of said incompressible layer,
    wherein said body includes a bead portion thicker than the total thickness of said incompressible and polymer layers.

13. An assembly as set forth in claim 12 wherein said incompressible layer consists of metal and is non-bendable.

14. An assembly as set forth in claim 12 wherein said polymer layers and said polymer body are integral and of the same polymer.

15. An assembly as set forth in claim 12 wherein said body includes a recess portion having a thickness less than said total thickness to define a recess adjacent said bead portion.

16. An assembly as set forth in claim 15 wherein said bead portion is disposed radially between said recess portion and said incompressible layer.

17. An assembly as set forth in claim 16 including a plurality of said incompressible layers with a sandwiched layer of polymer disposed between adjacent incompressible layers.

18. An assembly as set forth in claim 12 including a plurality of said incompressible layers with a sandwiched layer of polymer disposed between adjacent incompressible layers.

19. An assembly as set forth in claim 12 wherein said polymer layers each have a thickness of at least 0.005 inches and no greater than 0.025 inches.

* * * * *